United States Patent
Oberle

(10) Patent No.: US 7,377,447 B2
(45) Date of Patent: May 27, 2008

(54) TUNED RADIO FREQUENCY IDENTIFICATION (RFID) CIRCUIT USED AS A SECURITY DEVICE FOR WRISTBANDS AND PACKAGE SECURITY

(75) Inventor: Robert R. Oberle, Macungie, PA (US)

(73) Assignee: RCD Technology, Inc., Quarkertown, PA (US)

( * ) Notice: Subject to any disclaimer, the term of this patent is extended or adjusted under 35 U.S.C. 154(b) by 275 days.

(21) Appl. No.: 11/294,216

(22) Filed: Dec. 5, 2005

(65) Prior Publication Data

US 2007/0125867 A1 Jun. 7, 2007

(51) Int. Cl.
*G06K 19/06* (2006.01)

(52) U.S. Cl. .................... 235/492; 235/451

(58) Field of Classification Search .............. 235/451, 235/380, 487, 492; 340/572.1, 572.3, 568.2, 340/572.8

See application file for complete search history.

(56) References Cited

U.S. PATENT DOCUMENTS

| | | | |
|---|---|---|---|
| 3,759,246 A | 9/1973 | Flack et al. | |
| 5,058,161 A | 10/1991 | Weiss | |
| 5,463,377 A | 10/1995 | Kronberg | |
| 5,598,032 A | 1/1997 | Fidalgo | |
| 5,629,981 A | 5/1997 | Nerlikar | |
| 5,874,902 A | 2/1999 | Heinrich et al. | |
| 5,892,611 A | 4/1999 | Iisuka | |
| 5,942,978 A | 8/1999 | Shafer | |
| 5,963,134 A | 10/1999 | Bowers et al. | |
| 6,049,461 A | 4/2000 | Haghiri-Tehrani et al. | |
| 6,089,284 A | 7/2000 | Kaehler et al. | |
| 6,107,920 A * | 8/2000 | Eberhardt et al. | 340/572.7 |
| 6,111,520 A | 8/2000 | Allen et al. | |
| 6,130,623 A | 10/2000 | MacLellan et al. | |
| 6,133,833 A | 10/2000 | Sidlauskas et al. | |
| 6,144,303 A | 11/2000 | Federman | |
| 6,147,605 A * | 11/2000 | Vega et al. | 340/572.7 |
| 6,181,287 B1 * | 1/2001 | Beigel | 343/741 |
| 6,204,760 B1 | 3/2001 | Brunius | |
| 6,384,727 B1 * | 5/2002 | Diprizio et al. | 340/572.7 |
| 6,400,323 B2 | 6/2002 | Yasukawa et al. | |
| 6,421,013 B1 | 7/2002 | Chung | |
| 6,514,790 B1 | 2/2003 | Plettner et al. | |
| 6,774,800 B2 | 8/2004 | Friedman et al. | |
| 6,849,936 B1 | 2/2005 | Berman et al. | |
| 7,168,626 B2 * | 1/2007 | Lerch et al. | 235/492 |
| 7,283,054 B2 * | 10/2007 | Girvin et al. | 340/572.3 |
| 2002/0140608 A1 | 10/2002 | Zaghloul et al. | |
| 2003/0116790 A1 | 6/2003 | Kikuchi et al. | |
| 2003/0173408 A1 | 9/2003 | Mosher et al. | |
| 2004/0066296 A1 * | 4/2004 | Atherton | 340/572.1 |
| 2004/0070510 A1 | 4/2004 | Zhang et al. | |
| 2004/0104274 A1 * | 6/2004 | Kotik et al. | 235/492 |
| 2004/0189470 A1 * | 9/2004 | Girvin et al. | 340/568.2 |
| 2006/0087437 A1 * | 4/2006 | Lerch et al. | 340/572.8 |

FOREIGN PATENT DOCUMENTS

EP  0 903 805 A2  3/1999

OTHER PUBLICATIONS

International Search Report for PCT/US06/61181 dated Sep. 25, 2007, 9 pages.

* cited by examiner

*Primary Examiner*—Thien M Le
(74) *Attorney, Agent, or Firm*—Fliesler Meyer LLP

(57) ABSTRACT

A tamper evident RFID circuit uses a fold section that forms a capacitive element when folded together.

15 Claims, 1 Drawing Sheet

TUNED RADIO FREQUENCY IDENTIFICATION (RFID) CIRCUIT USED AS A SECURITY DEVICE FOR WRISTBANDS AND PACKAGE SECURITY

BACKGROUND OF INVENTION

A passive RFID circuit (transponder) generally consists of a tuned circuit, which often takes the form of a external antenna which receives both power and an information signal from the electromagnetic field emanated by a second system component (RFID reader), and a integrated circuit, which contains the microprocessor and memory components by which the transponder decodes and respond to an interrogation signal.

DETAILED DESCRIPTION OF EMBODIMENTS

Figure 1:
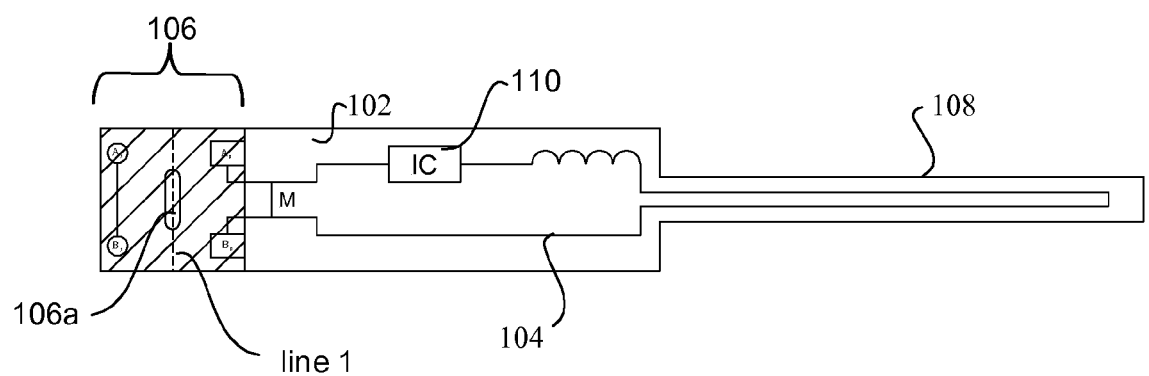
FIG. 1 is a diagram of an RFID circuit of one embodiment.

The design of the tuned circuit, herein referred to as the "antenna", can be carefully designed in order to facilitate satisfactory response to the field emanated by the RFID reader. Configuring the antenna such that disruption of the antenna by breaking one of the conductive traces of the antenna may be used to produce a tamper evident RFID device. Such RFID circuits can be used for wristbands and security locking devices, such as package security. The proper configuration and stability of passive components of the antenna (such as resistors and capacitors) can be required to maintain suitable performance of the antenna. A security device may be configured such that tampering with these passive components will cause either impaired or wholly different function of the device. Thus it is possible to configure a tamper evident RFID whose function is altered by configuring the passive components of the antenna. Further the device may be configured such that tampering with the components will likely disrupt several components simultaneously thus rendering the tamper evident nature of the device more robust than one in which tampering disrupts only one component.

FIG. 1 shows an example of a tamper resistant RFID circuit. An RFID circuit of one embodiment can have a substrate 102, antenna portion 104 on the substrate 102 and a fold section 106 on the substrate 102. The fold section 106 can contain an adhesive layer (shaded region). When the fold section 106 is folded together with the adhesive layer, at least one capacitor is created which sets the RF response characteristics of the RFID circuit.

In the RFID circuit 100 of FIG. 1, the elements $A_0$ and $B_0$ with their corresponding elements $A_1$ and $B_1$ can form a pair of parallel plate capacitors in series or parallel (dependent on the absence/presence of conductive link M) with the inductor coil 108 (part of the antenna pattern 104) and integrated circuit, IC. The capacitors can be formed by folding the flexible substrate 102 along the dotted line l, which is secured by an adhesive, such as a pressure sensitive adhesive.

An RFID wristband with a robust tamper evident closure may be formed by the insertion of the strap 108 of the wristband through the hole 106a and effecting the fastening of the wristband by folding the circuit along line l. Any attempt to cut the wristband is likely to sever the circuit that extends through the band if the band is cut in any position. Any attempt separate the adhesively joined sections is likely to disrupt the tuning of the circuit, such as by damaging the capacitors, and render the antenna non-functional. The antenna portion and/or capacitor(s) can be made of a conductive ink material that is susceptible to damage.

The substrate can have printed indicia, such as the line l, along a centerline of the fold section. A strap 108 can fit through the center hole 106a. The RFID antenna portion 104 can extend through the strap portion 108. A connection region can be used to connect the antenna portion 104 to an RFID IC 110. When the strap 108 is adhered to the wristband the RFID antenna portion 104 can extend completely around the wristband such that the wristband cannot be cut off without modifying the RF response of the RFID circuit.

One embodiment of the present invention is an RFID wristband comprising a substrate 102, an antenna portion 104 on the substrate 102; a strap 108 on the substrate 102; and a fold section 106 on the substrate 102. The fold section 106 can contain an adhesive layer (shaded region) and wherein when the fold section 100 is folded together with the adhesive layer at least one capacitor is created which set the RF response of the RFID circuit. The fold section can have hole 106a that the strap 108 fits into such that adhesive layer of the fold section 106 can hold the strap 108 in place. When the strap 108 is held in place with the adhesive. The strap 108 can be positioned apart from any capacitor.

The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scope of the invention is defined by the claims and their equivalents.

What is claimed is:

1. An RFID circuit comprising:
    an antenna portion on substrate,
    a fold section;
    wherein the fold section contains an adhesive layer and wherein when the fold section is folded together with the adhesive layer at least one capacitor is created which set the RF
    response characteristics of the RFID circuit;
    wherein the fold section has a center hole and the substrate has a strap that fits through the center hole, the strap having an RFID antenna portion that extends through the center hole when the strap is placed through the center hole and the fold section is folded down.

2. The RFID circuit of claim 1, wherein at least one capacitor would be damaged if the fold section is ripped apart after the fold section is folded down.

3. The RFID circuit of claim 1, wherein the substrate has printed indicia showing a center line of the fold section.

4. The RFID circuit of claim 1, wherein the strap is adhered with the adhesive layer with the fold section is folded down.

5. The RFID circuit of claim 4, wherein when the strap is adhered to the fold section the RFID circuit forms a wristband.

6. The RFID circuit of claim 5, wherein when the strap is adhered to the fold section the RFID antenna portion extends completely around the wristband such that the wristband can not be cut off without modifying the RF response of the RFID circuit.

7. The RFID circuit of claim 1, further comprises an RFID IC attached to a connector region.

8. The RFID circuit of claim 1, wherein the RFID circuit is an RFID wristband.

9. The RFID circuit of claim 1, wherein the RFID circuit is a security locking device.

10. An RFID wristband comprising;
   a substrate;
   an antenna portion of the substrate;
   a strap on the substrate; and
   a fold section on the substrate; wherein the fold section contains an adhesive layer and wherein when the fold section is folded together with the adhesive layer at least one capacitor is created which sets the RF response of the RFID circuit, wherein the fold section has a hole that the strap portion fits into such that adhesive layer of the fold section can hold the strap in place;
   wherein the strap has an RFID antenna portion that extends that through the center hole when the strap is placed through the center hole and the fold section is folded down.

11. The RFID wristband of claim 10, wherein when the strap is held in place with the adhesive, the strap is not under the any of the capacitors.

12. The RFID wristband of claim 10, wherein at least one capacitor can be damaged when the fold is ripped apart after the fold section is folded down.

13. The RFID wristband of claim 10, wherein the substrate has printed indicia showing a center line of the fold section.

14. The RFID wristband of claim 10, wherein when the strap is adhered to the wristband the RFID antenna portion extends completely around the wristband such that the wristband can not be cut off without modifying the RF response of the RFID circuit.

15. The RFID wristband of claim 10, further comprises an RFID IC attached to a connector region.

* * * * *